United States Patent [19]

Niskanen et al.

[11] Patent Number: 4,856,155
[45] Date of Patent: Aug. 15, 1989

[54] METHOD AND DEVICE IN AN ADJUSTABLE-CROWN ROLL

[75] Inventors: Juhani Niskanen, Oulunsalo; Martti Pullinen, Jyväskylä, both of Finland

[73] Assignee: Valmet Oy, Finland

[21] Appl. No.: 124,241

[22] Filed: Nov. 23, 1987

[30] Foreign Application Priority Data

Nov. 21, 1986 [FI] Finland .................................. 864758

[51] Int. Cl.$^4$ .................................................. B21B 31/24
[52] U.S. Cl. .................................. 29/113.2; 29/116.1; 29/116.2
[58] Field of Search .................. 29/113.2, 116.1, 116.2

[56] References Cited

U.S. PATENT DOCUMENTS

| | | | |
|---|---|---|---|
| 3,838,480 | 10/1974 | Depuy | 29/116 AD X |
| 3,885,283 | 5/1975 | Biondetti | 29/116 AD |
| 4,092,916 | 6/1978 | Link et al. | 29/116 AD X |
| 4,241,482 | 12/1980 | Biondetti | 29/116 AD |
| 4,319,522 | 3/1982 | Marchioro et al. | 29/116 AD X |
| 4,327,468 | 5/1982 | Kusters et al. | 29/116 AD |
| 4,477,954 | 10/1984 | Molinatto | 29/116 AD |

FOREIGN PATENT DOCUMENTS 600037 6/1978 Switzerland .
1546778 5/1979 United Kingdom .

Primary Examiner—Timothy V. Eley
Assistant Examiner—Frances Chin
Attorney, Agent, or Firm—Steinberg & Raskin

[57] ABSTRACT

Method in an adjustable-crown roll, in which a series of hydraulic loading elements is used. A central axle of the roll is supported by axle journals, by means of deflection bearings. A cross-section of the central axle is shaped such that the axle has sufficiently high rigidity in a nip plane. In the method, the central axle is rotated about its deflection bearings over an angle, which may be within the range of about 30° to 180°. A free space that is created or enlarged between the central axle and a roll mantle thereby, and provided between the central axle and an inner surface of the roll mantle, is utilized as an opening gap for the nip formed by the variable-crown roll, by allowing the roll mantle to be shifted, e.g. by the effect of gravity, or by affirmatively shifting the mantle relative to the rotated central axle.

27 Claims, 3 Drawing Sheets

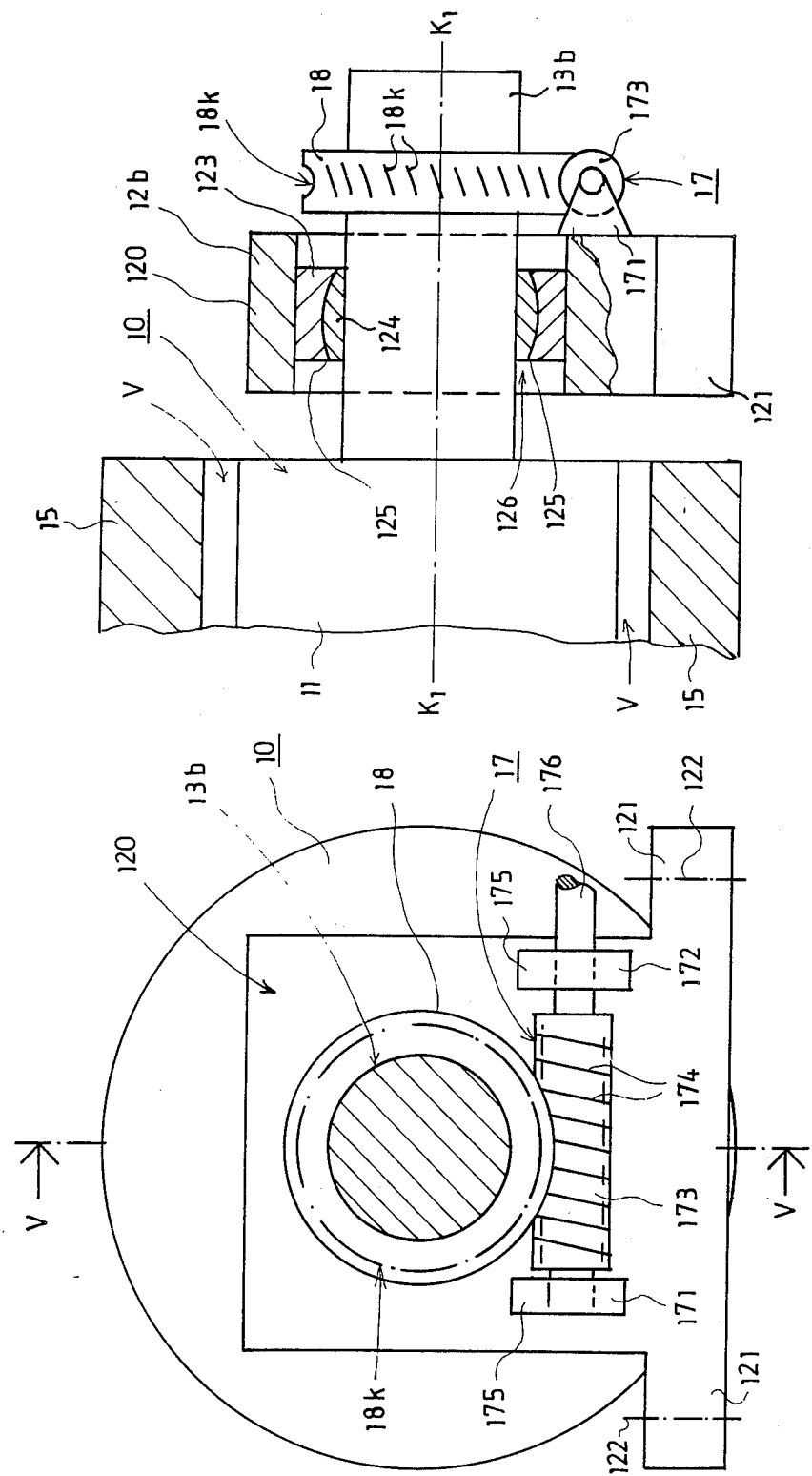

METHOD AND DEVICE IN AN ADJUSTABLE-CROWN ROLL

BACKGROUND OF THE INVENTION

The present invention concerns a method involving an adjustable-crown roll (a variable-crown roll), in which a series of hydraulic loading elements is used and which is placed in a plane of the nip that is formed between the variable-crown roll and a counter-roll, so as to act between a central axle of the variable-crown roll and a cylindrical mantle thereof. The cylindrical mantle is fitted around the axle so that the mantle can revolve about the axle, which is supported by axle journals thereof through deflection bearings or equivalent supporting structures. The central axle is shaped, regarding the cross-section thereof, such that the axle has sufficiently high rigidity in the nip plane.

The present invention further concerns a roll device intended for carrying out the method of the present invention, this roll device comprising a massive central axle and a roll mantle arranged to revolve about the axle, whereby, in a space between the central axle and the roll mantle, a series of glide-shoe loading-piston elements or equivalent is fitted, by means of which the profile of the nip that is formed by the variable-crown roll with a counter-roll thereof can be adjusted. The glide-shoe-piston series or equivalent can be fitted so as to act substantially in the plane of the nip. The stationary axle is supported from outside the roll mantle by means of articulation bearings or equivalent supports.

In paper machines, such rolls are commonly used to form a dewatering press nip, a smoothing nip, or a calendering nip with a counter-roll. In these purposes of use, it is important for the distribution of the linear load in the nip, i.e. the profile in the axial direction of the rolls, to be unvarying or adjustable as desired e.g., in order to control the moisture profile and/or the thickness profile (caliper) of the web in a transverse direction. For this purpose, various variable-crown or adjustable-crown rolls are known in the prior art, by means of which attempts have been made to act upon the distribution of linear load in a nip (the term "variable-crown roll" will be used below, to denote all types of variable-crown or adjustable-crown rolls).

Several different variable-crown rolls for paper machines are known in the prior art. As a rule, these rolls comprise a massive or tubular, stationary roll axle and a roll mantle arranged to revolve about the axle. Arrangements of glide shoes and/or a chamber or a series of chambers for pressure fluid are fitted between the axle and the mantle to act upon an inner face of the mantle, so that axial profile of the mantle at the nip can be aligned or adjusted as desired. As a rule, the nips formed by such rolls, such as press nips or calendering nips, are loaded by means of loading forces applied to the axle journals of the variable-crown roll and of the counter-roll.

So-called variable-crown rolls without loading arms are known in the prior art, in which the stroke length of the piston-cylinder elements of the hydraulic loading elements has been arranged to be large enough so that it is also sufficient for producing the opening movement and correspondingly the closing movement of the nip, and even so that loading arms acting upon ends of the roll axle and provided with power units are not needed at all. In such variable-crown rolls without loading arms, the hydraulic loading elements which act upon an inner face of the roll mantle, also produce a nip loading pressure per se, in addition to crown variation and nip profile.

When variable-crown rolls are used as press rolls, it is necessary to open the nips formed by the same, e.g., for servicing operations such as replacement of press felts. When a variable-crown roll is used as a calendar roll, the calendering nips must be opened, e.g., for the threading of the web.

Drawbacks of the prior art variable-crown rolls without loading arms include complicated construction and difficulties in making the stroke length of the piston-cylinder elements between the stationary central axle and the roll mantle sufficiently long, and in producing sufficiently high loading and crown-variation forces by means of the piston-cylinder elements.

With respect to the prior art most closely related to the present invention, reference is made to Finnish Pat. No. 57,004 (corresponding to U.S. Pat. No. 3,885,283) and to Finnish Pat. No. 67,923 (corresponding to DE-OS No. 3,003,396, and U.S. Pat. No. 4,327,468).

The prior art variable-crown rolls without loading arms have favorable properties of their own, but they have also involved the drawback that it has become necessary to reduce the dimensions and the rigidity of the stationary central axle of the variable-crown roll, because for the opening movement, a certain intermediate space must be provided between the roll mantle and the central axle in addition to the space that is required at the opposite side relative to the hydraulic loading elements for the deflection of the central axle. Such space requirement is, as a rule, at the maximum at the transverse center plane of the central axle. In view of the structural and functional properties of a variable-crown roll, it is however of extreme importance that the central axle be made as rigid as possible, explicitly in the plane of the nip and in the direction of the hydraulic loading elements. In the opposite direction, the rigidity of the central axle is not of as great importance.

SUMMARY OF THE INVENTION

Accordingly, it is an object of the present invention to provide a method and a device that can be applied in variable-crown rolls without loading arms, in a manner such that a nip formed by the roll can be opened and closed by means of simple method steps and device solutions or manipulations.

It is a further object of the present invention to provide a method and a device that can be accomplished so that rigidity of the central axle of the variable-crown roll in the nip plane and in the direction of loading by the loading elements, can be maximized.

These and other objects are attained by the present invention which is directed to a method for opening a nip formed between a counter roll and a variable-crown roll having a series of loading elements situated in a plane of the nip to act between a central axle and a cylindrical mantle of the variable crown roll. The mantle is fitted about the axle for rotation thereabout, while the axle is at axle journals thereof and is formed to have a cross-section providing sufficiently high rigidity in a plane of the nip. More particularly, the present invention comprises the steps of rotating the axle about the journals thereof over an angle relative to a position in which the axle is positioned when the nip is closed and in which the nip can be loaded, whereby a space between the axle and an inner surface of the mantle adjacent the nip is formed or enlarged, and shifting the variable crown roll mantle relative to the axle, whereby size of the thus-formed space decreases, the crown roll mantle moves way: from the counter roll, and the nip is opened.

The variable crown roll may be supported through deflection bearings at the axle journals thereof, with the axle being rotated about the deflection bearings thereof. Furthermore, the loading elements may be hydraulic, while the mantle may be shifted by allowing the same to move downwardly by its own weight or through effect of gravity. Furthermore, the axle itself may be rotated about 30° to 180°.

The present invention is also directed to a variable crown roll comprising a central axle and a mantle rotatably disposed about the axle. A series of loading elements are fitted between the axle and an inner surface of the roll mantle, by which profile of a nip formed with the variable crown roll and a counter-roll can be adjusted. These loading elements are fitted to act substantially in a plane of the nip.

The axle is supported from outside of the roll mantle, and is mounted for rotation about a center thereof. A space is formed or enlarged between the axle and the mantle inner surface when the axle is rotated out of position for loading the nip, which permits the nip to be opened. Furthermore, a gap may be positioned between the mantle inner surface and a side of the axle opposite the loading elements, which permits a mantle amount of play between the axle and the mantle inner surface at a center plane of the axle when the axle is maximumly deflected or when the nip is maximumly loaded.

The loading elements may form a series of glide shoe-loading pistons, while the axle itself may be supported by articulation bearings or equivalent supports. Furthermore, the axle may be mounted for rotation of at least about 30° about the center thereof, preferably about 60° to 180° about the center thereof. The mantle is shiftable to open the nip, e.g. by its own weight or gravity.

With a view to achieving the above-noted objectives and those which will become apparent below, the method of the present invention is principally characterized by the central axle being rotated about deflection bearings thereof or equivalent supports, over an angle which is within a range of about 30° to 180° relative the position in which the central axle is positioned when the nip is closed and in which the nip can be loaded, and a free space that is opened, i.e. created or enlarged, or "made free" between the central axle and the roll mantle due to the step described above, provided between the central axle and an inner face of the roll mantle, being utilized as an opening gap for the nip formed by the variable-crown roll, by allowing the roll mantle to be shifted by the effect of gravity, or by shifting the roll mantle relative to the rotated central axle itself.

Furthermore, the roll in accordance with the present invention is principally characterized by a discrete gap being provided between the stationary central axle of the variable-crown roll and the cylindrical inner surface of the mantle arranged to rotate about the axle, this gap being dimensioned such that, when the central axle is maximumly deflected, a minimum or small amount of play remains in a center plane of the central axle between the central axle and the inner surface of the roll mantle, the axle journals or equivalent of the central axle being attached to deflection bearings or equivalent which are fitted in a manner such that the central axle can revolve about its own revolving center, means for rotating the axle being engaged with the same, i.e. rotating devices being fitted to act upon the central axle by means of which the central axle can be rotated about the revolving center thereof over at least about 30°, preferably about 60° to 180°, and the central axle and the roll mantle being fitted in such a manner relative to one another that, after rotating of the axle, a space is produced or enlarged between the central axle and the inner surface of the roll mantle which permits the nip to be opened, e.g. by effect of gravity (of the mantle weight).

In the present invention, rotation of the central axle about the rotation joints provided on the axle journals or equivalent of the central axle is utilized, such rotation joints already being necessary in order to permit deflection of the central axle. By rotating the central axle over about 30° to 180° about the center of rotation thereof, it is possible to utilize either the lateral space of the central axle or, even more advantageously, space between the central axle and the revolving mantle that must be provided for deflection of the central axle when the axle is loaded by means of the series of hydraulic elements. Thus, in the present invention, stroke length of the hydraulic loading elements can be dimensioned just long enough so that stroke length is sufficient for the loading and profiling of the nip. The construction of the hydraulic elements thereby becomes much more simple and more reliable as compared with corresponding long-stroke loading-element series used in prior art variable-crown rolls without loading arms.

BRIEF DESCRIPTION OF THE DRAWINGS

The present invention will be further described in greater detail with reference to certain exemplifying embodiments thereof illustrated in the accompanying drawings, the present invention being in no way strictly limited to the details of such embodiments. In the drawings

FIG. 4 is a sectional view along line IV—IV of FIG. 2; and

FIG. 5 is a vertical sectional view along line V—V of FIG. 4.

DESCRIPTION OF THE PREFERRED EMBODIMENTS

Figures 1, 2:
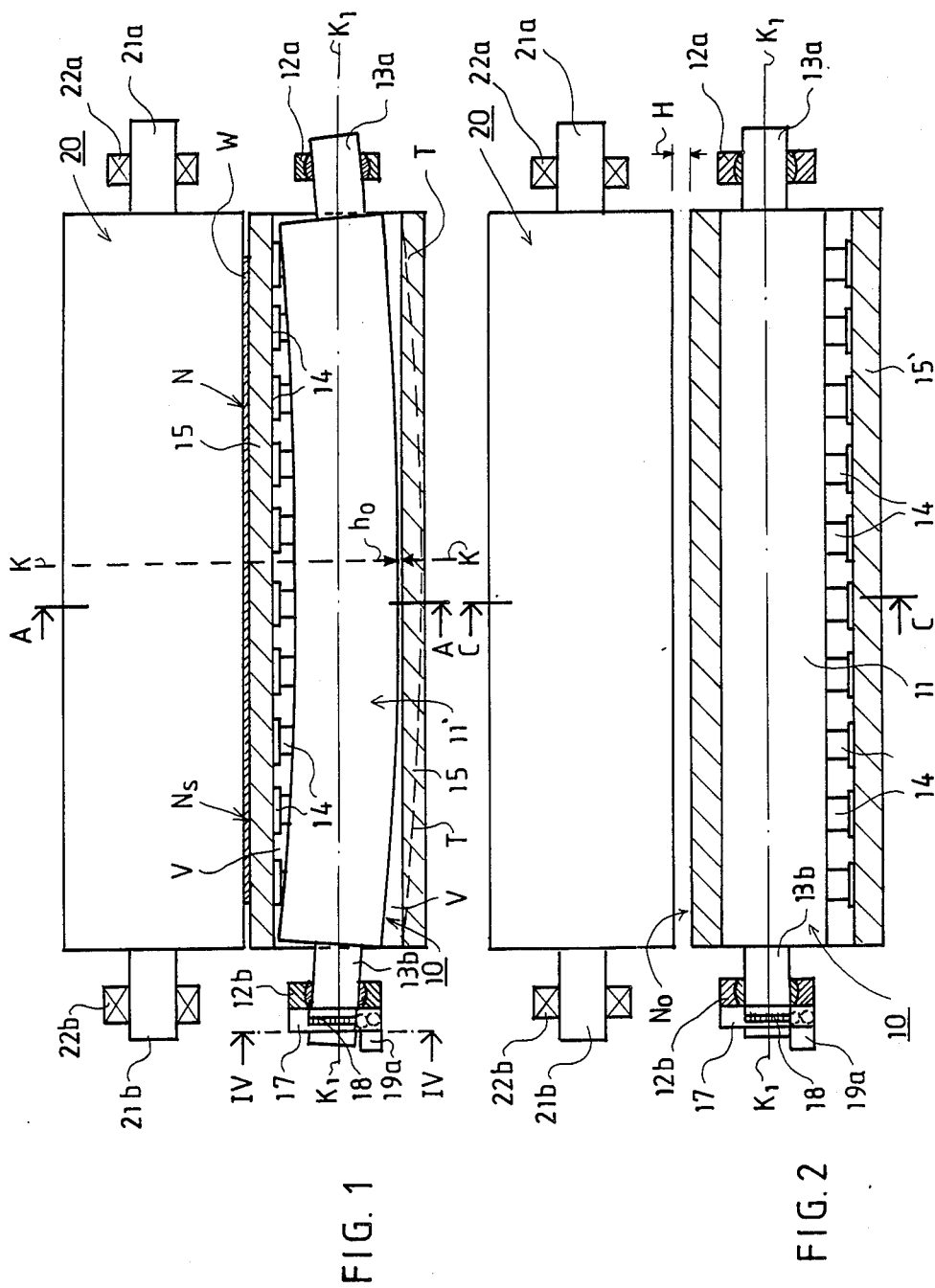
FIG. 1 illustrates a variable-crown roll in accordance with the present invention, forming a closed nip with a counter roll thereof.
FIG. 2 is a similar illustration to FIG. 1, showing the nip opened by means of the method of the present invention.

A variable-crown roll 10 is illustrated in the figures, forming a nip N with a counter-roll 20. The counter-roll 20 is journalled through axle journals 21a and 21b thereof, which revolve in bearings 22a, 22b. The supports for the bearings 22a, 22b are preferably stationary.

The variable-crown roll 10 comprises a stationary massive central axle 11, which is attached to deflection bearings 12a and 12b through its axle journals 13a and 13b. The deflection bearings are supported on the frame by means of preferably stationary, bearing supports.

In a manner known in and of itself, the central axle 11 is provided with a series of hydraulic cylinder-piston glide-shoe elements 14. An adjustable hydraulic pressure can be passed into the cylinder 14c of each of the elements 14. Lubricated glide shoes 14b are pressed against a smooth inner face of the roll mantle 15. By means of the glide shoes 14b of the elements 14, it is possible to generate an adjustable pressure profile in a longitudinal direction of the nip N, for the purpose of regulating and controlling moisture or caliper of the web W.

A centre plane of the rolls 10,20 in the machine direction, is denoted by K—K in FIG. 1 A web W is shown as passing through a closed nip $N_S$, this web being, for example, a paper web which is pressed for the purpose of dewatering or which is calendered.

The central axle 11 is shown in the deflected position 11' in FIG. 1, where a force has been generated between the central axle 11 and the revolving roll mantle 15 by means of the hydraulic loading elements 14. Between the roll mantle 15 and the central axle 11, there is a space V, which is dimensioned so that, when the central axle 11' is maximumly deflected, a little gap $h_o$ remains between the inner surface of the roll mantle 15 and the outer side 11d of the central axle 11 at the middle of the axle. The magnitude of this gap $h_o$ is of the order of $h_o$=about 2 to 10 mm.

Figure 3A:
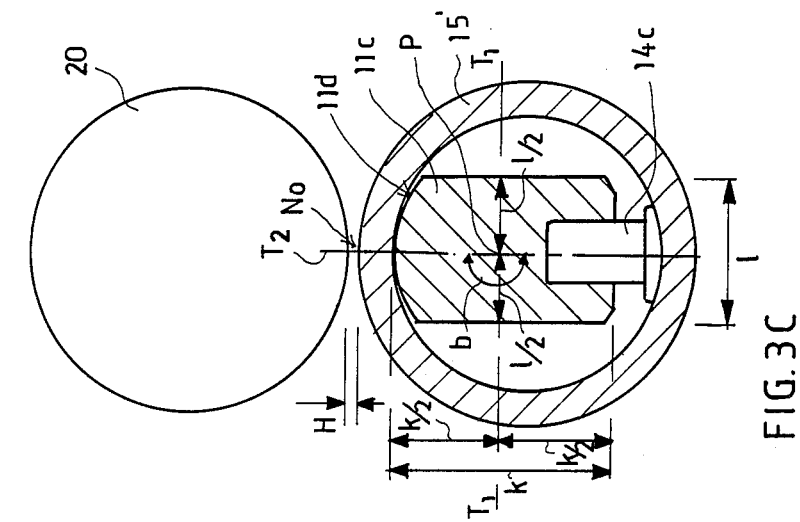
FIG. 3A is a sectional view along line A—A of FIG. 1.

The axial revolving centre of the central axle 11 is denoted by the line $K_1$—$K_1$ in FIGS. 1 and 2. The centre $K_1$—$K_1$ is, at the same time, the revolving center of the deflection bearings 12a, 12b. The center $K_1$—$K_1$ is situated on a line of intersection of planes $T_1$—$T_1$ and $T_2$—$T_2$, the point of intersection of these planes being denoted by reference character P in FIGS. 3A, 3B and 3C.

In the variable-crown roll 10 in accordance with the present invention, a novel and advantageous method of opening the nip is applied. When the closed nip $N_S$ is to be opened, the loading pressure is removed from the loading elements 14 and the central axle 11 is rotated from the position shown in FIGS. 1 and 3A about the revolving center $K_1$—$K_1$, either according to FIG. 3B over an angle a which is about 90°, or according to FIG. 3C over an angle b which is about 180°. The roll mantle 15 is then shifted (e.g. it can be shifted by gravity), to the position 15', hereby the nip $N_S$ is shifted into the open position $N_O$, with the shortest or smallest distance between the mantles of the rolls 10 and 20 being denoted by H.

The angle of rotation of the central axle must, as a rule, be at least about 30°, preferably at least about 60°. The most advantageous embodiments of the invention are, as a rule, obtained when the central axle 11 is rotated bout 180°, whereby the very same free space $V_O$ which is necessary for the deflection of the axle (FIG. 3A) is utilized in a novel and favorable manner, and, if necessary, planar sides 11a and 11b of the central axle 11 may be provided with means for the supply of loading fluid to the series of elements 14 and with devices by means of which oil is sprayed onto the inner face of the roll mantle 15 so as to lubricate and/or heat the same.

The rotation of the central axle 11 over an angle a or over an angle b is performed through the axle journal 13b of the axle 11 by means of a rotation gear 17. FIGS. 4 and 5 illustrate construction of the rotation gear 17 and of the deflection bearings 12a, 12b in greater detail. The deflection bearings 12 comprise a frame part 120, with an outer bearing ring 123 fixed in opening 126 thereof. An inner ring 124 of the deflection bearing is fixed on the axle journal 13b (13a). The bearing rings 123 and 124 are provided with spherical bearing faces 125 in contact with one another, which permit changes in position of the bearing rings 123 and 124 relative to one another as the central axle 11 is deflected.

The frame part 120 is provided with footing or support parts 121, which are attached to frame beams of the paper machine or to any other foundation by way of screws 122. The deflection bearing described above will also permit rotation of the central axle 11 about the revolving center $K_1$—$K_1$ thereof. This rotation is performed by way of the rotation gear 17. The rotation gear 17 comprises a toothed rim 18 attached about an outer end of the axle journal 13b and provided with diagonal toothing 18k. The toothed rim 18 is driven by a screw 173, which is mounted on supports 171 and 172 situated at an outer side of the frame part 120 by means of bearings 175.

The screw 173 is provided with a spiral thread 174 corresponding to the toothing 18k. The screw 173 is driven through its shaft 176, e.g., by means of an hydraulic motor 19a or a corresponding power source. Operation of the hydraulic motor 19a is controlled, e.g., by limit switches (not illustrated), by means of which the sector of rotation of the axle 11 is set as desired.

According to the present invention, the nip N can be arranged to be openable by means of the opening devices of the variable-crown roll, when the variable-crown roll has no loading arms, i.e. when the axle journals 13a and 13b of the central axle 11 are attached to stationary deflection bearings 12a and 12b, whereby the pressure loading of the nip N and the adjustment and control of this loading are achieved by means of the series of hydraulic elements 14.

The central axle 11 is preferably provided with planar sides 11a and 11b, as well as with a partially planar side 11c provided with the loading elements 14, and a side 11d opposite the loading elements 14 and having a radius $R_1$ of curvature which is slightly shorter than, or substantially equal to an inner radius $R_O$ of the mantle 15. The side 11c preferably has edge chamferings. The side 11d has a curved face or an equivalent face consisting of several planar faces.

According to the present invention, a nip opening mechanism without loading arms can be arranged in connection with a variable-crown roll 10, while at the same time maximizing the rigidity of the central axle in the direction of loading of the nip. In other words, it is possible to use a more rigid central axle 11 in the direction of loading of the nip N than in prior art variable-crown rolls that have no loading arms but are provided with a possibility of opening the nip.

As stated above, the prior art variable-crown rolls without loading arms and the nip opening mechanism provided therein, are based on the stroke length of the hydraulic loading elements 14 being dimensioned large enough to permit opening of the nip 15. Thereby, of the dimension of the roll mantle denoted with k in FIG. 3C, the portion is lost that corresponds to the space between the side 11d of the central axle 11 and the deflection line T—T indicated in FIG. 1.

In the present invention, it is advantageously possible to utilize the space $V_O$ (FIG. 3A) as the nip N opening gap. This space $V_O$ must necessarily be provided between the inner surface of the roll mantle 15 and the side 11d of the central axle 11 which is the opposite side relative to the loading elements 14.

Figure 3B:
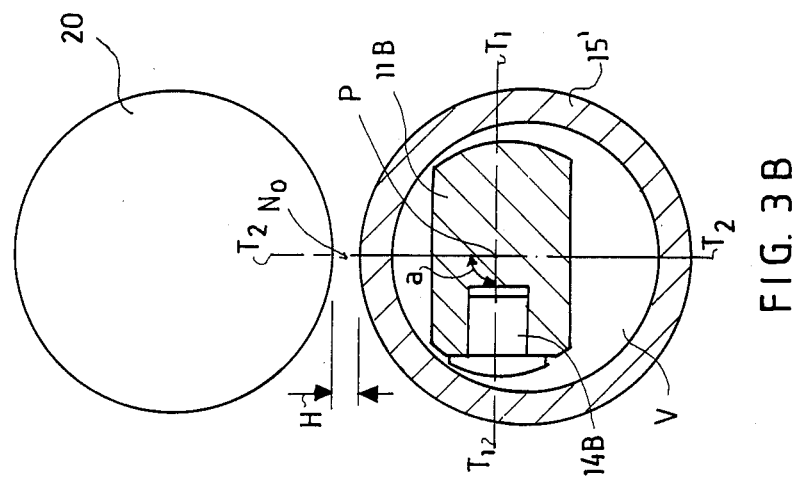
FIG. 3B is a vertical sectional view of the nip similar to FIG. 3A, with the nip having been opened by way of the method of the present invention.

Opening of the nip N illustrated in FIGS. 3B and 3C will be described in greater detail below. According to FIG. 3B, the central axle 11 has been rotated over an angle a = about 90° into the position 11B, whereby the vertical center plane becomes situated in the plane $T_1—T_1$. The nip N can then be opened by the distance H. The gap of displacement H between the roll mantle 15 and the central axle 11, and the magnitude of the gap in the opened nip $N_O$ are limited by lateral areas of the side of the central axle 11B, that is normally substantially parallel to the nip plane $T_2—T_2$, and also possibly by the glide shoe 14B.

Figure 3C:
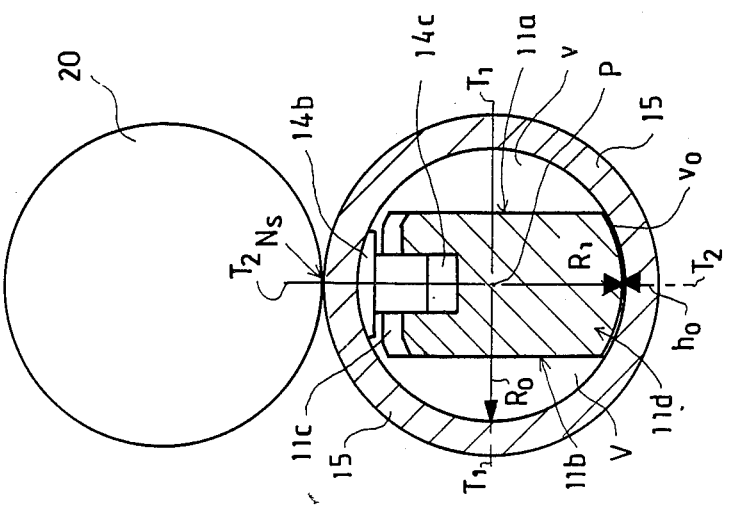
FIG. 3C is a sectional view along line C—C of FIG. 2, with the nip having been opened by means of the method of the present invention.

In FIG. 3C, the central axle 11C has been rotated over an angle b of about 180°, whereby the hydraulic loading elements 14C are situated at the opposite side relative to the nip N. The opening gap H of the nip is determined by the outer side 11d of the central axle 11, which is located at the opposite side relative to the loading elements 14c and which is preferably shaped substantially in accordance with an inner radius $R_O$ of the cylindrical mantle 15.

The central axle 11 is dimensioned and the center of rotation $K_1—K_1$ is situated preferably so that the revolving center point P is situated at the midpoint (k/2) of the dimension k of the central axle 11 substantially parallel to the nip plane as shown in FIG. 3C. Correspondingly, in the direction of the width dimension 1 shown in FIG. 3C, the center of rotation P is situated at the midpoint of the dimension 1.

It is advantageous to dimension the cross-section of the central axle 11 within certain limits when the method of the present invention is applied. More particularly, it is preferable for the dimension k of the central axle 11, indicated in FIG. 3C, to be k = about (0.7 ... 0.97) × $2R_O$ ($2R_O$ is an inner diameter of the roll mantle 15). Moreover, the dimension 1 of the opposite direction and the dimension k should preferably have a certain ratio so that 1 = about (0.6 ... 1.0) × k.

If necessary, guiding devices may be provided between the central axle 11 and the revolving roll mantle 15, these guiding devices producing a supporting effect between the axle 11 and the mantle 15 in addition to the effect of the hydraulic elements 14. These devices, if they are required at all, can be provided in a great number of different ways and situated, e.g., at both sides of the center plane K—K of the mantle 15 outside the end areas of the mantle. Such devices must not disturb or prevent opening/closing of the nip in accordance with the present invention.

In the exemplary embodiments described above and illustrated in the figures, the axis of rotation of the mantle is situated substantially coaxially with the revolving centers of deflection bearings 12a and 12b when the nip is in the closed position. This concentricity and coaxiality is, however, not necessary, and the normal revolving center of the mantle 15 may be situated closer to the nip than the revolving centers of the deflection bearings 12a and 12b. By means of the eccentricity obtained in this fashion, and with the axle journals 13a and 13b being rotated in accordance with the present invention, the opening gap of the nip can be increased if required.

The preceding description of the present invention is merely exemplary, and is not intended to limit the scope thereof in any way.

What is claimed is:

1. Method for opening a nip formed between a counter roll and a variable crown roll having a series of loading elements situated in a plane of the nip to act between a central axle and a cylindrical mantle of said variable crown roll, the mantle being fitted about the axle for rotation thereabout and the axle being supported at axle journals thereof and being formed to have a cross-section providing sufficiently high rigidity in the plane of the nip, comprising the steps of rotating said axle about a longitudinally-extending axis around the journals thereof over an angle relative to a position in which the axle is positioned when the nip is closed and in which the nip can be loaded, whereby a space between the axle and an inner surface of the mantle adjacent to the nip is formed or enlarged, and shifting the roll mantle relative to the axle, whereby size of the thus-formed space decreases, the mantle moves away from the counter roll, and the nip is opened.

2. The method of claim 1, wherein the variable crown roll is supported through deflection bearings at the axle journals thereof and the axle is rotated about the deflection bearings thereof.

3. The method of claim 1, wherein the loading elements are hydraulic.

4. The method of claim 1, wherein the roll mantle is shifted by allowing the same to move downwardly by its own weight.

5. The method of claim 1, wherein the axle is rotated about 30° to 180°.

6. The method of claim 5, wherein the axle is rotated about 90°, whereby magnitude of the thus-formed space between the axle and mantle inner surface, and thereby magnitude of the opened nip, is limited by lateral areas of the axle that are normally about 90° away from the nip plane when the nip is closed.

7. The method of claim 6, wherein the lateral areas of the axle are also about 90° away from the loading elements.

8. The method of claim 5, wherein the axle is rotated about 180°, whereby the loading elements become situated substantially opposite the nip and the magnitude of the thus-formed space between the axle and mantle inner surface, and thereby magnitude of the opened nip, is determined by a side of the central axle opposite the loading elements.

9. The method of claim 8, wherein the opposite side of the axle comprises a radius of curvature substantially equal to or slightly smaller then a radius of curvature of the mantle inner surface.

10. The method of claim 1, wherein the axle is rotated by a power transmission mechanism connected to at least one of the axle journals.

11. A variable crown roll, comprising a central axle and a mantle rotatably disposed about said axle, a series of loading elements fitted between said axle and an inner surface of said roll mantle, by which profile of a nip formed with said variable crown roll and a counter-roll can be adjusted, said elements being fitted to act substantially in a plane of the nip, said axle being supported from outside of said roll mantle, wherein said axle is mounted for rotation around a longitudinally-extending axis thereof, and a space is formed or enlarged between said axle and said mantle inner surface when said axle is rotated out of position for loading the nip, which permits the nip to be opened.

12. The combination of claim 11, additionally comprising a gap positioned between said mantle inner surface and a side of said axle opposite the loading elements, which provides a small amount of play between said axle and said mantle inner surface at a center plane of said axle, when said axle is maximumly deflected or when said nip is maximumly loaded.

13. The combination of claim 12, wherein the play is on the order of about 2 to 10 mm.

14. The combination of claim 11, wherein said loading elements form a series of glide, shoe-loading pistons.

15. The combination of claim 11, wherein said axle is supported by articulation bearings.

16. The combination of claim 11, additionally comprising means for rotating said axle which are engaged with said axle.

17. The combination of claim 16, additionally comprising a pair of axle journals supporting said axle, and wherein said rotating means are connected to one of said axle journals.

18. The combination of claim 17, additionally comprising a pair of deflection bearings, each situated at a respective axle journal, for supporting said axle with said rotating means being positioned, adjacent one of said bearings and on a side thereof away from said mantle.

19. The combination of claim 17, wherein said rotating means comprise a cogwheel or toothed rim affixed to said respective axle journal, and a screw engaged with said cogwheel or toothed rim for driving the same.

20. The combination of claim 11, wherein said axle is mounted for rotation of at least about 30° around a center thereof.

21. The combination of claim 20, wherein said axle is mounted for about 60° to 180° rotation about the center thereof.

22. The combination of claim 11, wherein said mantle is shiftable to open the nip by gravity.

23. The combination of claim 11, wherein said axle is formed with substantially planar opposite sides which are substantially parallel to the plane of the nip when said axle is in loading position.

24. The combination of claim 23, wherein said axle additionally comprises a curved side opposite the loading elements.

25. The combination of claim 24, wherein said curved side has a radius of curvature substantially equal to or slightly less than a radius of curvature of said mantle inner surface.

26. The combination of claim 23, wherein said axle additionally comprises a side receiving said loading elements which is chamfered.

27. The combination of claim 23, wherein depth of said axle which is substantially perpendicular to width of said axle between said opposite planar sides, is about 0.7 to 0.97 of an inner diameter of said roll mantle, and the width of said axle between said opposite planar sides is about 0.6 to 1.0 of the depth thereof.

* * * * *